United States Patent
Menhusen (10) Patent No.: US 11,874,767 B2
(45) Date of Patent: Jan. 16, 2024

(54) MEMORY PARTITIONS FOR PROCESSING ENTITIES

(71) Applicant: HEWLETT PACKARD ENTERPRISE DEVELOPMENT LP, Houston, TX (US)

(72) Inventor: Ryan D. Menhusen, Ft. Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 70 days.

(21) Appl. No.: 17/644,353

(22) Filed: Dec. 15, 2021

(65) Prior Publication Data

US 2023/0185707 A1 Jun. 15, 2023

(51) Int. Cl.
*G06F 12/02* (2006.01)
*G06F 12/0846* (2016.01)
*G06F 13/16* (2006.01)
*G06F 9/54* (2006.01)
*G06F 9/30* (2018.01)

(52) U.S. Cl.
CPC ........ *G06F 12/0238* (2013.01); *G06F 9/3009* (2013.01); *G06F 9/546* (2013.01); *G06F 12/0848* (2013.01); *G06F 13/1663* (2013.01)

(58) Field of Classification Search
CPC ............. G06F 12/0238; G06F 12/0848; G06F 9/3009; G06F 13/1663; G06F 13/1652; G06F 17/16
See application file for complete search history.

(56) References Cited

U.S. PATENT DOCUMENTS

| 4,075,423 A | 2/1978 | Martin et al. |
| 5,944,774 A | 8/1999 | Dent |
| 6,718,392 B1 | 4/2004 | Krause |
| 6,829,685 B2 | 12/2004 | Neal et al. |
| 6,950,945 B2 | 9/2005 | Pfister et al. |
| 6,990,528 B1 | 1/2006 | Neal et al. |
| 7,010,633 B2 | 3/2006 | Arndt et al. |
| 7,103,626 B1 | 9/2006 | Recio et al. |
| 7,113,995 B1 | 9/2006 | Beukema et al. |
| 7,493,409 B2 | 2/2009 | Craddock et al. |
| 7,979,548 B2 | 7/2011 | Arndt et al. |

(Continued)

OTHER PUBLICATIONS

Ruye Wang, "Cache Memory: Replacement Policy," 2020, available: https://web.archive.org/web/20200814000302/http://fourier.eng.hmc.edu/e85_old/lectures/memory/node4.html.*

(Continued)

*Primary Examiner* — Tracy A Warren
(74) *Attorney, Agent, or Firm* — Yao Legal Services, Inc.

(57) ABSTRACT

In some examples, a system partitions a shared memory address space of a shared memory among a plurality of processing entities into a plurality of memory partitions, where a respective memory partition is associated with a respective processing entity. A first processing entity forwards, to a second processing entity, a first data operation, based on a determination by the first processing entity that the first data operation is to be applied to data for a memory partition associated with the second processing entity. The second processing entity applies the first data operation that includes writing data of the first data operation to the memory partition associated with the second processing entity using a non-atomic operation.

19 Claims, 6 Drawing Sheets

(56) References Cited

U.S. PATENT DOCUMENTS

| | | | |
|---|---|---|---|
| 8,392,668 B2 | 3/2013 | Reuter | |
| 8,407,421 B2 | 3/2013 | Steely et al. | |
| 9,112,767 B2 | 8/2015 | Ansari et al. | |
| 9,575,890 B2 | 2/2017 | Busaba et al. | |
| 10,185,824 B2 | 1/2019 | Venkataramani et al. | |
| 10,824,694 B1 | 11/2020 | Gebremariam et al. | |
| 10,929,293 B2 | 2/2021 | Byrne et al. | |
| 11,561,823 B1* | 1/2023 | Loganathan | G06F 9/52 |
| 2011/0296437 A1* | 12/2011 | Raut | G06F 9/526 |
| | | | 719/314 |
| 2015/0149737 A1* | 5/2015 | Hobson | G06F 9/52 |
| | | | 711/152 |
| 2016/0352663 A1* | 12/2016 | Hopkins | H04L 51/226 |
| 2019/0050255 A1* | 2/2019 | Chagam Reddy | G06F 9/4881 |
| 2021/0056397 A1 | 2/2021 | Dally et al. | |
| 2021/0056399 A1 | 2/2021 | Dally et al. | |
| 2021/0056446 A1 | 2/2021 | Dally et al. | |
| 2021/0286619 A1* | 9/2021 | Volkov | G06F 9/544 |

OTHER PUBLICATIONS

Menhusen et al., U.S. Appl. No. 17/644,352 entitled Accumulators Corresponding to Bins in Memory filed Dec. 15, 2021 (35 pages).

\* cited by examiner

MEMORY PARTITIONS FOR PROCESSING ENTITIES

BACKGROUND

A memory can store data that is shared among multiple processing entities. The processing entities can refer to machine-readable instructions or hardware processors. For example, processing entities can include threads. A multi-threaded system can execute multiple threads in parallel. Hardware processors can include microprocessors, cores of multi-core processors, microcontrollers, digital signal processors, or any other type of processing circuitry.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

When computation on shared data in memory is divided among multiple processing entities, techniques can be provided to protect data integrity during multi-step update sequences. An example of a multi-step update sequence includes parallel processing entities concurrently reading data values of the shared data, applying an operator on data values read by the processing entities, and then writing back the modified data values produced by the operator. In such cases, for any specific data value at a given memory location, the last results produced by a given processing entity would overwrite any previous concurrent results from other processing entities.

In some examples, to prevent data corruption, locks (such as mutexes can be employed). In other examples, atomic operations supported by processors can be employed. As further examples, atomic operations of a network fabric can be employed to ensure that a result of an operator from a first processing entity is visible prior to initiating another operator on the same data.

Locks and atomic operations may incur latency that is significantly greater than non-atomic operations. This can slow down programs running in a system.

In accordance with some implementations of the present disclosure, a shared memory is partitioned among multiple processing entities such that the shared memory (or more specifically, a shared memory address space of the shared memory) is divided into individual memory partitions that are associated with respective individual processing entities. Data that is to be written to the memory partitions are handled by respective memory partition owners.

Each processing entity is assigned exclusive ownership over a respective memory partition of the shared memory. This allows a single-writer access to the respective memory partitions since multiple processing entities will not be contending for access of the same memory partition. A processing entity "owns" or has "exclusive ownership" of a memory partition if the processing entity has the exclusive right among the multiple processing entities to write to the memory partition. In other words, among the multiple processing entities, only one processing entity has the right to write to the memory partition—the remaining processing entities of the multiple processing entities do not have the right to write the memory partition. Note that a program (e.g., an operating system (OS) or firmware) that has higher privileges than the processing entities may be able to write to the shared memory address space.

The memory partitions owned by respective processing entities can be considered "atomic" memory partitions in that they can be updated without contention from multiple processing entities.

Based on use of the atomic memory partitions, a common data structure (stored in the atomic memory partitions) can be accessed by multiple processing entities in parallel while avoiding the use of any atomic operations or locks to update the common data structure containing data to be updated by data operations of multiple processing entities.

In some examples, a first processing entity forwards a first data operation to a second processing entity based on a determination by the first processing entity that the first data operation is to be applied to data for a memory partition associated with the second processing entity. The second processing entity applies the first data operation that includes writing data of the first data operation to the memory partition associated with the second processing entity using a non-atomic operation (and without using any locks).

Figure 1:
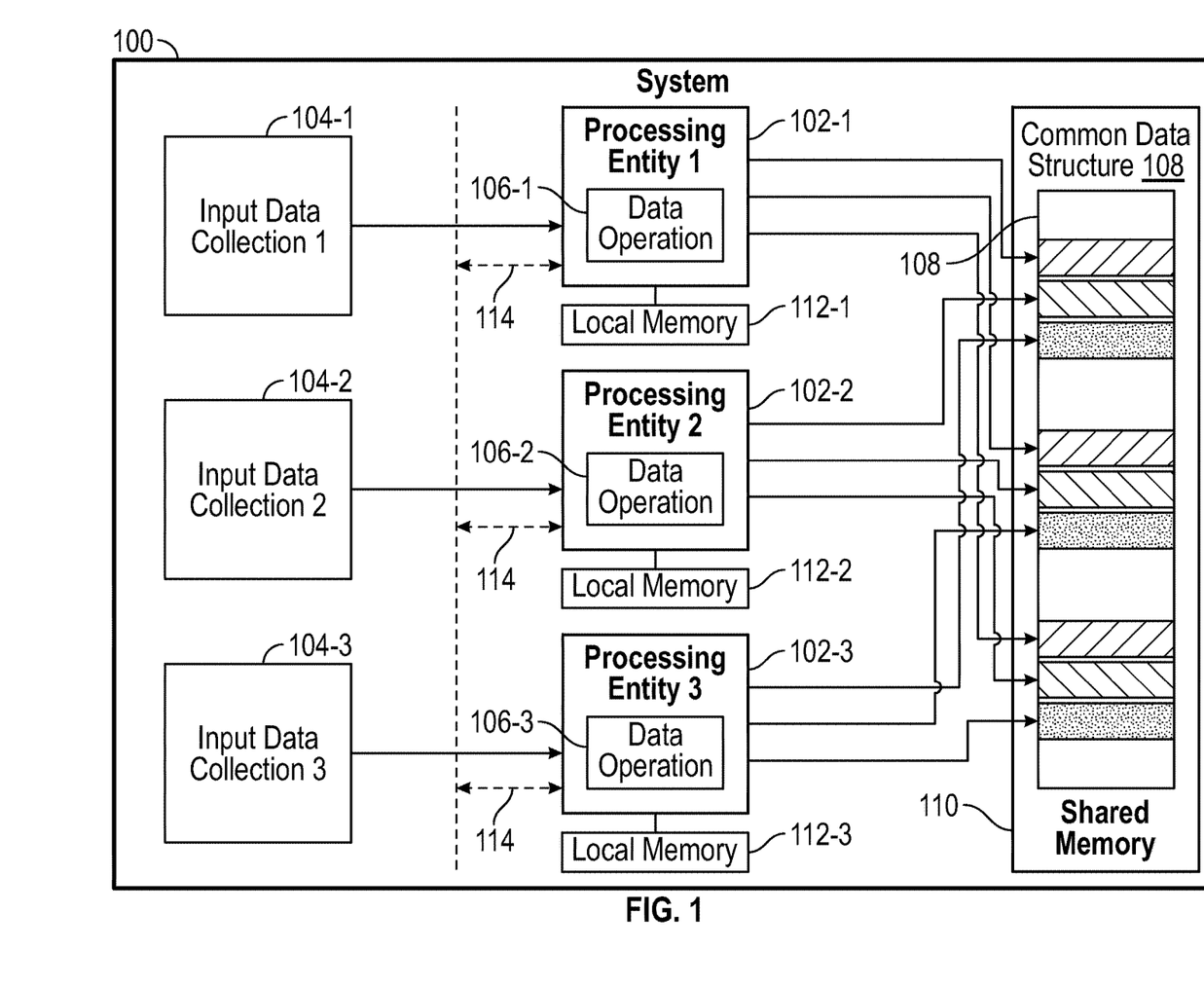
FIG. 1 is a block diagram of a system including processing entities according to some examples.

FIG. 1 shows an example system 100 that includes multiple processing entities 102-1, 102-2, and 102-3. Although three processing entities are shown in FIG. 1, in other examples, there can be less than or more than three processing entities. In some examples, the processing entities 102-1 to 102-3 include threads that execute in the system 100. In other examples, the processing entities 102-1 to 102-3 can include hardware processors or other types of processing entities.

The system 100 can include one compute node or multiple compute nodes. A "compute node" can refer to a computer or a collection of multiple computers.

Each processing entity processes a respective input data collection to apply a respective operator that applies a data analytics operation on the respective input data collection. The first processing entity 102-1 can apply a data operation 106-1 that processes data in an input data collection 104-1, the second processing entity 102-2 can apply a data operation 106-2 that processes data in an input data collection 104-2, and the third processing entity 102-3 can apply a data operation 106-3 that processes data in an input data collection 104-3. An "input data collection" includes a collection of data records (one data record or multiple data records). The input data collections 104-1 to 104-3 may be received from entities in the system 100 or from external sources.

Data operations applied by the processing entities 102-1 to 102-3 can be applied with respect to data stored in respective local memories 112-1 to 112-3. As examples, the local memories 112-1 to 112-3 are caches that can be accessed with higher access speeds than the shared memory 110. A data operation can be applied on data retrieved from a local memory, and/or resultant data produced by the data operation can be written to the local memory.

In some examples, a data operation 106-1 to 106-3 can include a data accumulation operation (e.g., a count operation to count a quantity of occurrences of an attribute value), a summing function or another type of mathematical aggregation function (e.g., to compute an average, a median, a maximum, a minimum, etc.), or any other type of data operation.

As depicted in FIG. 1, the processing entities 102-1 to 102-3 can update respective portions of a common data structure 108 with resultant values produced by the data operations 106-1 to 106-3. Examples of the common data structure 108 include a histogram, a table, a file system, and so forth.

The common data structure 108 is stored in a shared memory 110. The shared memory 110 can be implemented with a collection of memory devices (one memory device or multiple memory devices), such as dynamic random access memory (DRAM) devices, static random access memory (SRAM) devices, flash memory devices, disk-based storage devices, and so forth.

The common data structure 108 includes entries stored in a shared memory address space associated with the shared memory 110. A memory address space includes memory locations defined by respective memory addresses.

The shared memory address space in which the common data structure 108 is stored is divided into multiple partitions 108-1, 108-2, and 108-3, in examples where there are three processing entities 102-1, 102-2, and 102-3. If there are fewer processing entities or more processing entities, there can be fewer partitions or more partitions.

Each processing entity 102-$i$ owns a respective partition 108-$i$ ($i$ equal 1 to 3). In some examples, the partitions 108-1 to 108-3 are interleaved with one another.

Interleaving the partitions 108-1, 108-2, and 108-3 refers to alternating segments of the partitions 108-1, 108-2, and 108-3 such that multiple segments of any given the partition are separated by segments of other partitions.

In other examples, the partitions 108-1, 108-2, and 108-3 are not interleaved.

As further represented by arrows 114, the processing entities 102-1 to 102-3 can communicate with one another, such as by using inter-process communications, using queues, or any other type of interface. For example, the first processing entity 102-1 can send a message to the second processing entity 102-2, where the message can include information related to a data operation, to cause the second processing entity 102-2 to apply the data operation. As used here, a "message" can refer to an information element that can carry specified information between processing entities. As an example, if the first processing entity 102-1 determines that a first data operation to be applied to data (e.g., a data record that is part of the input data collection 104-1) is for storage in a memory partition associated with another processing entity (e.g., the second processing entity 102-2), then the first processing entity 102-1 sends a message to the second processing entity 102-2, where the message contains information of the first data operation to be performed. The message causes the second processing entity 102-2 to perform the first data operation, which includes writing resultant data produced by the first data operation to the memory partition associated with the second processing entity 102-2.

In some examples, partitioning of data across the partitions 108-1 to 108-3 of the common data structure 108 can be based on hash values computed based on attribute(s) of data records in the input data collections 104-1 to 104-3.

Figure 2:
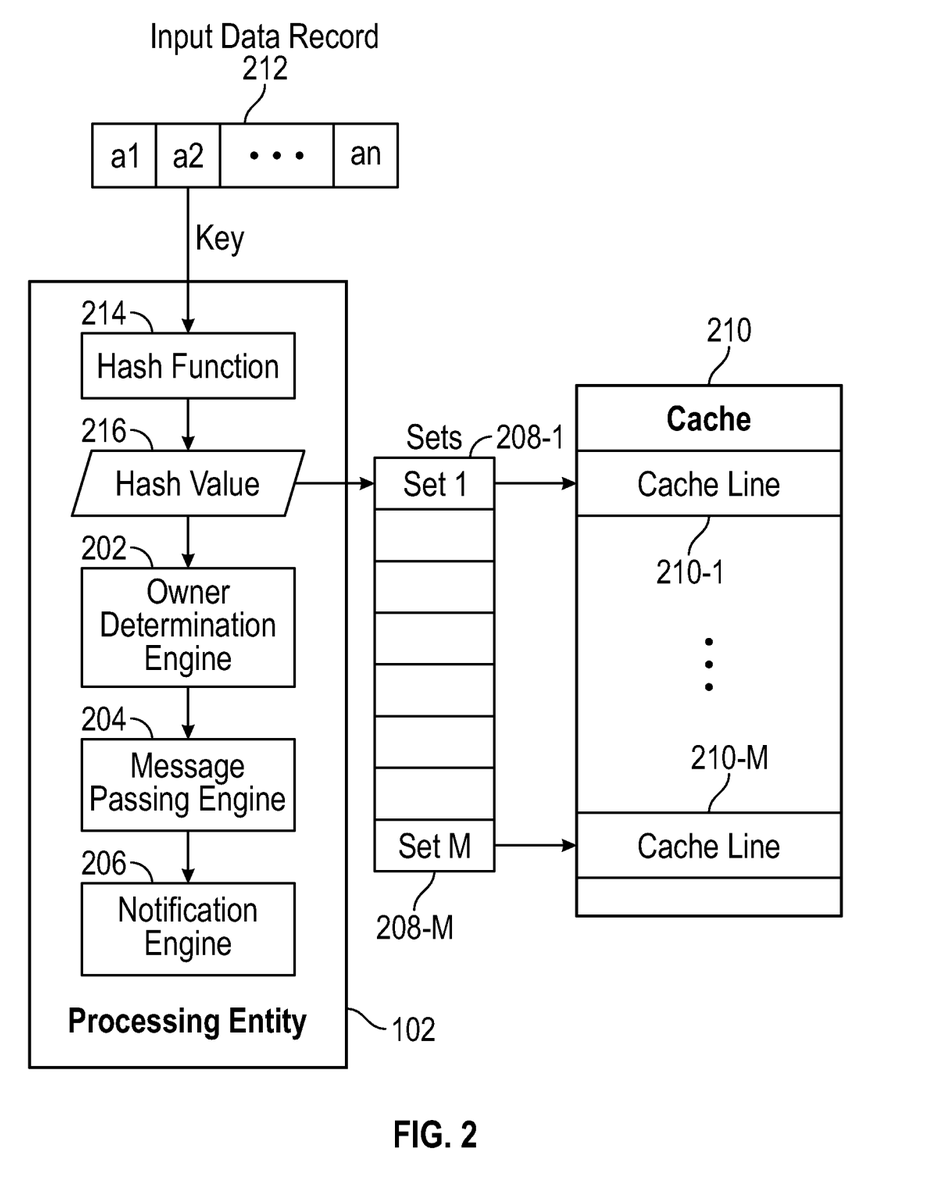
FIG. 2 is a block diagram of a processing entity according to some examples.

FIG. 2 shows an example in which a processing entity 102 (e.g., one of the processing entities 102-1 to 102-3 of FIG. 1) is to handle an input data record 212 (e.g., from one of the input data collections 104-1 to 104-3).

The input data record 212 has multiple attributes a1, a2, . . . , an. In the example, it is assumed that attribute a2 is a key. A "key" can include a collection of attributes (a single attribute or multiple attributes) in a data record. The key can be used in some examples to distribute data records across partitions of the common data structure 108.

As shown in FIG. 2, the value of the key of the input data record 212 is provided to an input of a hash function 214. In some examples, the hash function 214 can be a cryptographic hash function, such as a Secure Hash Algorithm (SHA) function in some examples.

The hash function 214 produces a hash value 216 based on the value of the key (e.g., value of the attribute a2). The hash value 216 can be used to determine to which partition of the partitions 108-1 to 108-3 the input data record 212 belongs. This determination would allow the processing entity 102 to identify the owner processing entity of the partition to which a resultant value produced based on a data operation applied to the input data record 212 would be written.

The processing entity 102 includes an owner determination engine 202 that is to determine the owner processing entity associated with the input data record 212. As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

As examples, the owner determination engine 202 can include a map, where a lookup value refers to a section of memory that provides a value to the destination. As another example, the owner determination engine 202 can include a decoder, where the hash value is decoded to a destination processing entity. As further examples, the owner determination engine 202 can include a lookup engine or a translator.

In further examples, the owner determination engine 202 can compute Hash(KeyV)%Num_P, where Hash( ) represents the hash function 214, KeyV represents a value of a key in an input data record, % represents a modulus operation, and Num_P represents the number of processing entities in the system 100. The operation Hash(KeyV)%Num_P produces an integer that is one of multiple values that refers to one of the multiple partitions owned by respective processing entities. In the example of FIG. 1 with three processing entities, the operation Hash(KeyV)%Num_P produces one of three integer values (e.g., 1, 2, or 3) to refer to one of the three partitions 108-1 to 108-3, respectively. Thus, the operation Hash(KeyV)%Num_P produces an output value that identifies the owner processing entity (e.g., an output value of 1 identifies the first processing entity 102-1, an output value of 2 identifies the second processing entity 102-2, and an output value of 3 identifies the third processing entity 102-3.

The processing entity 102 further includes a message passing engine 204 that is to send messages to other processing entities. For example, if the owner determination engine 202 indicates to the message passing engine 204 that the owner processing entity for the input data record 212 is processing entity X (where X is one of multiple integer values), then the message passing engine 204 sends a message to processing entity X.

In some examples, the message includes information describing the data operation (e.g., data accumulation, data aggregation, etc.) to be performed, data on which the data operation is to be performed, and possibly other information. The data on which the data operation is to be performed can be identified by identifying a memory location (e.g., with a memory address) of a memory where the data is stored. The data referred to by the message can include the input data record 212, or alternatively or additionally, can include resultant data produced by the data operation applied on the input data record 212 by the processing entity 102.

In other examples, a message does not include information describing the data operation. Rather, different data operations can be associated with different operation queues, and the messages for different data operations can be sent to respective different operation queues. A target processing entity can determine what data operation to apply dependent upon which operation queue a message is retrieved from.

The processing entity 102 further includes a notification engine 206. In some examples, the notification engine 206 can send a notification to an owner processing entity in response to the message passing engine 204 having placed a threshold quantity of messages into a queue associated with the owner processing entity (discussed further below). In other examples, the notification engine 206 can be omitted.

In some examples, the hash value 216 maps to one of multiple sets 208-1 to 208-M. The possible hash values produced by the hash function 214 correspond to the number of sets in a cache 210 (which can be a software cache or a hardware cache), which is an example of a local memory (e.g., 112-1, 112-2, or 112-3) used by a processing entity. In some examples, the key values are mapped uniformly over the total number of sets for higher cache utilization.

Each set 208-$j$ ($j$=1 to M) represents an amount of data that can fit within a unit of access, such as a cache line 210-1 to 210-M of the cache 210. A cache line is a unit of data transfer between the cache 210 and the shared memory 110. More generally, a unit of access of a local memory refers to an amount of data that is transferred as a unit between the local memory and the shared memory 110.

In the example of FIG. 2, it is assumed that the hash value 216 maps to the set 208-1. Different hash values produced by the hash function 214 would map to different sets.

In some examples, partitioning by sets corresponding to units of access, such as cache lines, can avoid multiple processing entities sharing discrete access to a single data unit.

Further, the hash-based partitioning is able to distribute work more uniformly across processing entities for a target access pattern, such as an access pattern of the common data structure 108. For example, the number of partitions defined by the hash-based partitioning is set to exceed the arrival rate of data operations divided by the operation latency (the latency of a processing entity in performing a data operation).

Figure 3:
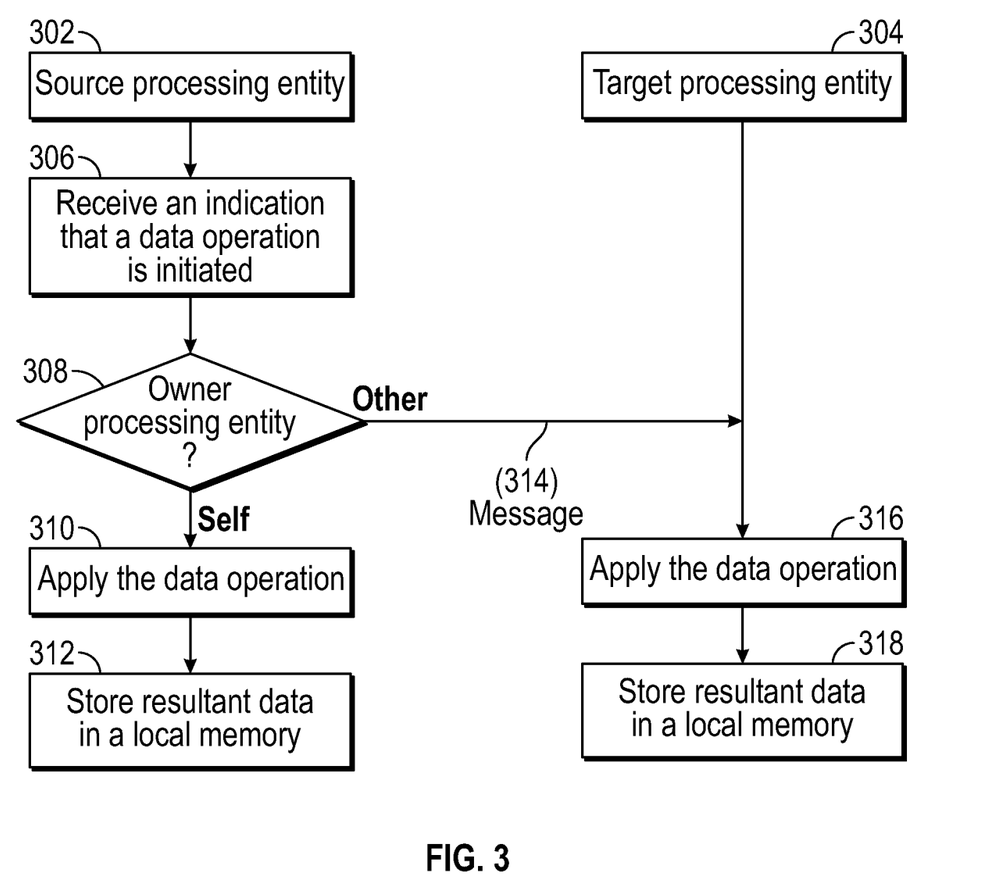
FIG. 3 is a flow diagram of a process according to some examples.

FIG. 3 is a flow diagram of a process involving a source processing entity 302 and a target processing entity 304 according to some examples. The "source" processing entity is the processing entity at which a data operation is initiated. The "target" processing entity is the processing entity to which a data operation is transferred under certain conditions.

The source processing entity 302 receives (at 306) an indication that a data operation is to be initiated. For example, the source processing entity 302 receives input data on which the data operation is to be applied. Alternatively, the source processing entity 302 may have received a command from another source, where the command specifies the data operation to be performed.

The owner determination engine 202 in the source processing entity 302 determines (at 308) which processing entity is the owner processing entity for the input data on which the data operation is to be applied.

If the owner processing entity is the source processing entity 302 ("Self" branch of 308), then the source processing entity 302 applies (at 310) the data operation on the input data, and stores (at 312) resultant data from the data operation in a local memory of the source processing entity 302.

If the owner processing entity is the target processing entity 304 ("Other" branch of 308), then the message passing engine 204 sends (at 314) a message including information of the data operation to the target processing entity 304. In response to forwarding the data operation from the source processing entity 302 to the target processing entity 304 (by sending the message), the source processing entity 302 disassociates from the data operation to allow the source processing entity 302 to continue another data operation.

In response to the message, the target processing entity 304 applies (at 316) the data operation and stores (at 318) resultant data from the data operation applied by the target processing entity 304 in a local memory of the target processing entity 304.

Filtering accesses through a specific processing entity will also improve data locality, thus increasing cache utilization if available. Additionally, this method expands the supported native atomic operations to any sequence expressible as a single-threaded software algorithm.

In some examples, each processing entity (e.g., 102-1 to 102-3) is associated with a queue (or more generally, a queuing arrangement) to allow the processing entities to communicate with one another (e.g., to pass messages between one another).

Figure 4:
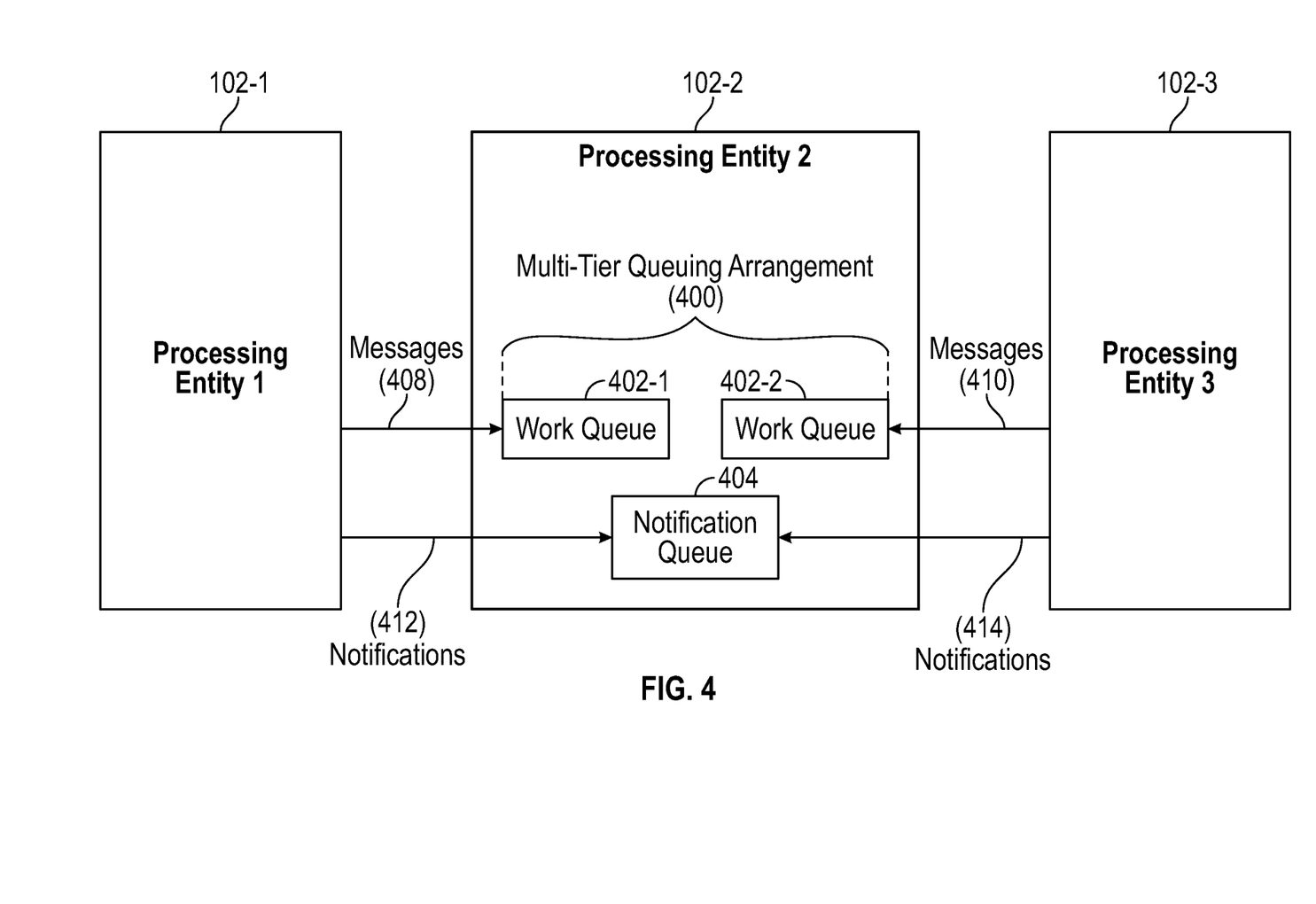
FIG. 4 is a block diagram of multiple processing entities that include a multi-tier queuing arrangement, according to some examples.

In some examples, the queuing arrangement used can be a multi-tier queuing arrangement that includes multiple tiers of queues. FIG. 4 is a block diagram of a multi-tier queuing arrangement 400 that is associated with the second processing entity 102-2. Note that each of the first processing entity 102-1 and the third processing entity 102-3 can also be associated with its respective multi-tier queuing arrangement.

In some examples, the multi-tier queuing arrangement 400 includes a first tier of work queues 402-1 and 402-2, and a second tier of a notification queue 404. The work queue 402-1 is used by the first processing entity 102-1, and the work queue 402-2 is used by the third processing entity 102-3. In other examples, the first tier can include more work queues if there are a larger number of processing entities.

To transfer respective data operations to the second processing entity 102-2, the first processing entity 102-1 can send messages (408) to the work queue 402-1. Similarly, to transfer respective data operations to the second processing entity 102-2, the third processing entity 102-3 can send messages (410) to the work queue 402-2.

In some examples, multiple messages can build up in a work queue (402-1 or 402-2) until a threshold quantity of messages are queued. In response to the threshold quantity of messages being queued, a source processing entity can send a notification to the notification queue 404 in the second tier. The notification queue 404 can be shared by multiple processing entities, such as 102-1 and 102-3 in FIG. 4. The first processing entity 102-1 (the source processing entity) sends a notification 412 to the notification queue 404 in response to the first processing entity 102-1 having sent R number of messages 408 to the work queue 402-1, where R≥1. If R>1, then the messages in the work queue 402-1 are bundled or batched for processing by the second processing entity 102-2 (the target processing entity), to amortize the cost of transferring messages or message ownership to the target processing entity. Similarly, the third processing entity 102-3 sends a notification 414 to the notification queue 404 in response to the third processing entity 102-3 having sent R number of messages 410 to the work queue 402-2.

The notification 412 or 414 identifies which source processing entity's work queue 402-1 or 402-2, respectively, has pending messages. In response to receiving the notification, the second processing entity 102-2 retrieves respective messages from the work queue of the source processing entity, and performs corresponding data operations of the respective messages.

As the second processing entity 102-2 owns the partition 108-2 of the common data structure 108 to which the resultant data of the data operations identified in the messages retrieved from the work queue are to be added, the second processing entity 102-2 is able to perform updates of the partition 108-2 without any atomic operations.

Note also that no atomic operations are employed to write messages to a work queue 402-1 or 402-2, since each source processing entity writes messages to a respective different work queue in the target processing entity.

However, since the notification queue 404 is shared by multiple source processing entities, a notification is written to the notification queue using an atomic operation.

Figure 5:
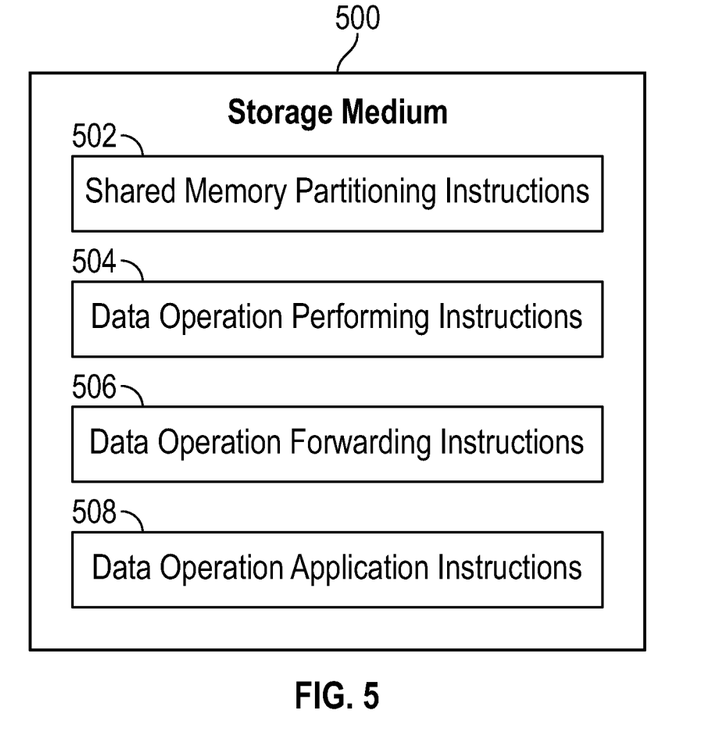
FIG. 5 is a block diagram of the storage medium storing machine-readable instructions according to some examples.

FIG. 5 is a block diagram of a non-transitory machine-readable or computer-readable storage medium 500 storing machine-readable instructions that upon execution cause a system (e.g., 100 in FIG. 1) to perform various tasks.

The machine-readable instructions include shared memory partitioning instructions 502 to partition a shared memory address space of a shared memory (e.g., 110 in FIG. 1) among a plurality of processing entities (e.g., 102-1 to 102-3 in FIG. 1) into a plurality of memory partitions, where a respective memory partition is associated with a respective processing entity.

In some examples, each processing entity of the plurality of processing entities has exclusive ownership of a respective memory partition of the shared memory address space, such that the respective memory partition is not subject to access contention by multiple processing entities.

The machine-readable instructions include data operation performing instructions 504 to perform, by the plurality of processing entities, data operations in local memories (e.g., 112-1 to 112-3 of FIG. 1 or 210 of FIG. 2) of the plurality of processing entities, the data operations for updating a common data structure (e.g., 108 in FIG. 1) in the shared memory address space.

In some examples, each respective local memory has a unit of access (e.g., a cache line) that is transferred as a unit between the respective local memory and the shared memory, where the respective local memory is divided into a plurality of sets corresponding to respective different units of access, and where a data operation in the respective local memory performed by a respective processing entity is on data in one set of the plurality of sets.

The machine-readable instructions include data operation forwarding instructions 506 to forward, by a first processing entity to a second processing entity, a first data operation, based on a determination by the first processing entity that the first data operation is to be applied to data for a memory partition associated with the second processing entity.

In some examples, in response to the forwarding of the first data operation from the first processing entity to the second processing entity, the first processing entity disassociates from the first data operation to allow the first processing entity to continue another data operation.

The machine-readable instructions include data operation application instructions 508 to apply, by the second processing entity, the first data operation that includes writing data of the first data operation to the memory partition associated with the second processing entity using a non-atomic operation.

In some examples, the first data operation applied by the second processing entity includes writing data of the first data operation to the memory partition associated with the second processing entity, by combining (e.g., summing or another data aggregation) the data of the first data operation with data in the memory partition associated with the second processing entity.

Figure 6:
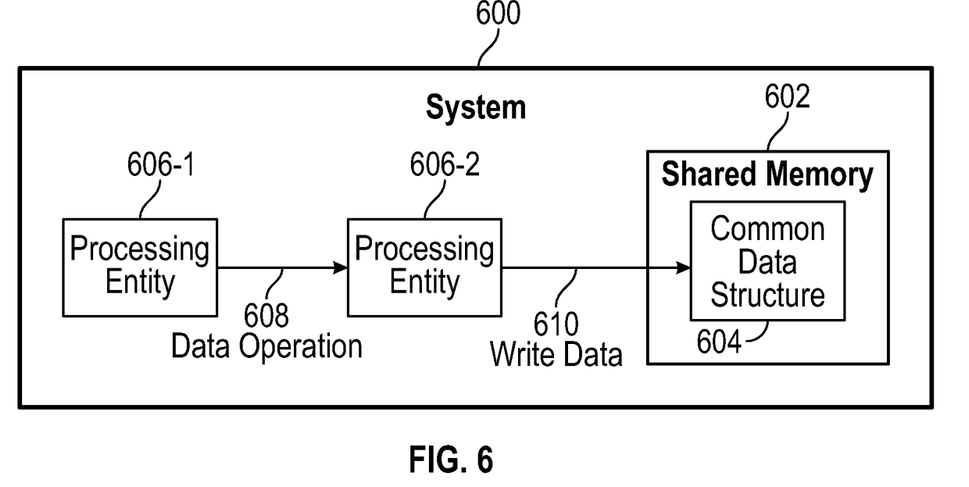
FIG. 6 is a block diagram of a system according to some examples.

FIG. 6 is a block diagram of a system 600 according to some examples. The system 600 includes a shared memory 602 to store a common data structure 604.

The system 600 includes a plurality of processing entities (including a first processing entity 606-1 and a second processing entity 606-2) that can access the common data structure 604 in the shared memory 602. A shared memory address space of the shared memory 602 is partitioned among the plurality of processing entities into a plurality of memory partitions, where a respective memory partition is owned by a respective processing entity.

The first processing entity 606-1 makes a determination that a first data operation is to be applied to data for a memory partition associated with the second processing entity 606-2. Based on the determination, the first processing entity 606-1 forwards (at 608) the first data operation to the second processing entity 606-2.

The second processing entity 606-2 performs the first data operation forwarded from the first processing entity 606-1, where the first data operation includes writing (at 610) data of the first data operation to the memory partition associated with the second processing entity 606-2 using a non-atomic operation.

Figure 7:
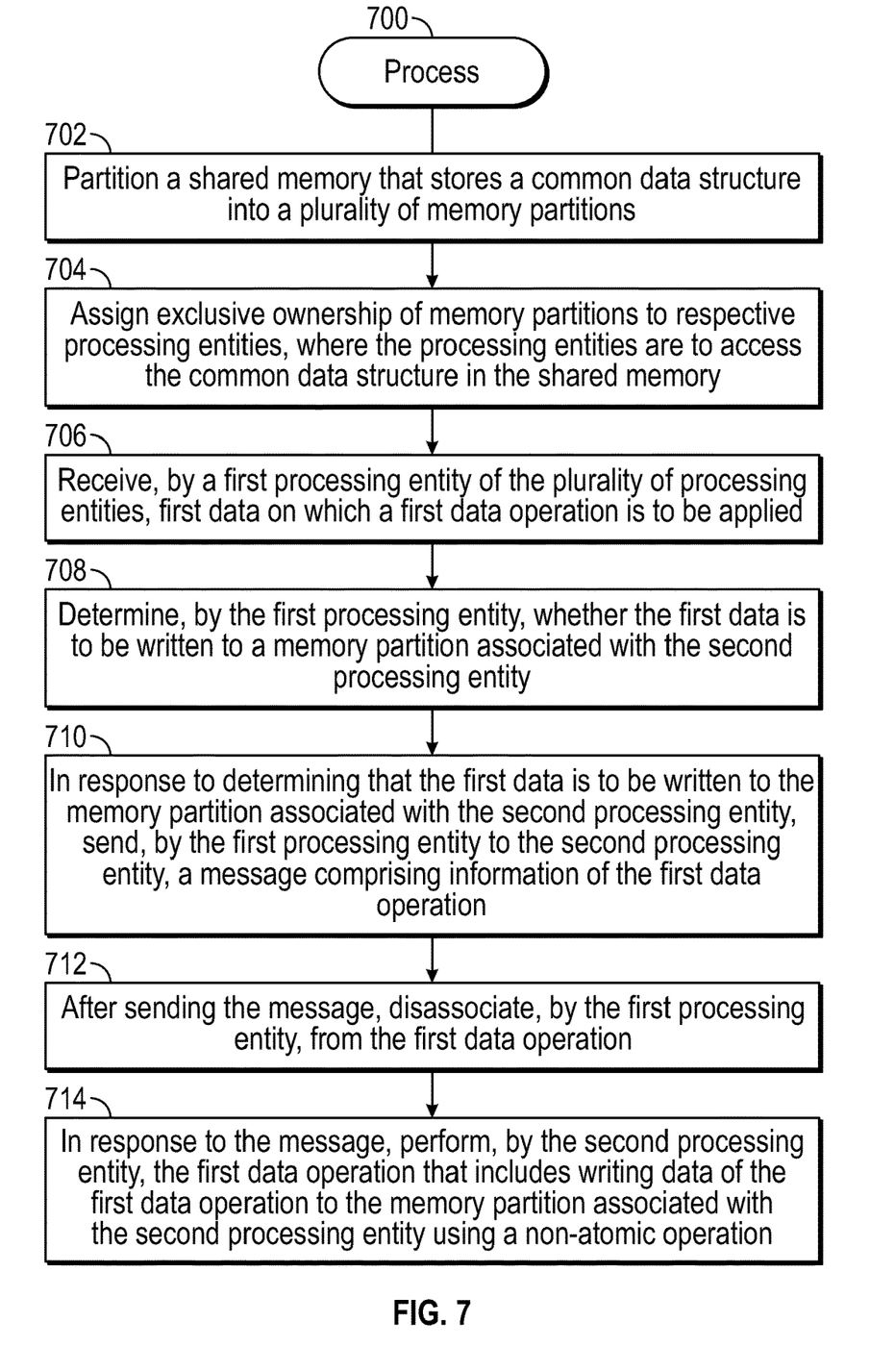
FIG. 7 is a flow diagram of a process according to some examples.

FIG. 7 is a flow diagram of a process 700 according to some examples of the present disclosure.

The process 700 includes partitioning (at 702) a shared memory that stores a common data structure into a plurality of memory partitions. This partitioning can be performed by an OS or another entity in a system.

The process 700 includes assigning (at 704) exclusive ownership of memory partitions to respective processing entities, where the processing entities are to access the common data structure in the shared memory. The ownership assignment can be performed by the OS or another entity in the system.

The process 700 includes receiving (at 706), by a first processing entity of the plurality of processing entities, first data on which a first data operation is to be applied. The first data operation may be initiated based on receipt of input data or receipt of a command from a source.

The process 700 includes determining (at 708), by the first processing entity, whether the first data is to be written to a memory partition associated with the second processing entity. The determination can be based on applying a hash function on a key of the first data, for example.

The process 700 includes, in response to determining that the first data is to be written to a memory partition associated with the second processing entity, sending (at 710), by the first processing entity to the second processing entity, a message comprising information of the first data operation. The message can be sent to a queue associated with the second processing entity, for example.

The process 700 includes, after sending the message, disassociating (at 712), by the first processing entity, from the first data operation. By disassociating from the first data operation, the first processing entity is free to perform other data operations.

The process 700 includes, in response to the message, performing (at 714), by the second processing entity, the first data operation that includes writing data of the first data operation to the memory partition associated with the second processing entity using a non-atomic operation.

A storage medium (e.g., 500 in FIG. 5) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   partition a shared memory address space of a shared memory among a plurality of processing entities into a plurality of memory partitions, wherein each processing entity of the plurality of processing entities has exclusive ownership of a corresponding memory partition of the plurality of memory partitions of the shared memory address space, such that a respective memory partition is not subject to access contention by multiple processing entities of the plurality of processing entities;
   perform, by the plurality of processing entities, data operations in local memories of the plurality of processing entities, the data operations for updating a common data structure in the shared memory address space;
   forward, by a first processing entity to the second processing entity, a first data operation, based on a determination by the first processing entity that the first data operation is to be applied to data in a memory partition exclusively owned by the second processing entity; and
   apply, by the second processing entity, the first data operation that comprises writing data of the first data operation to the memory partition exclusively owned by the second processing entity using a non-atomic operation.

2. The non-transitory machine-readable storage medium of claim 1, wherein the instructions upon execution cause the system to:
   in response to the forwarding of the first data operation from the first processing entity to the second processing entity, disassociate, by the first processing entity, from the first data operation to allow the first processing entity to continue another data operation.

3. The non-transitory machine-readable storage medium of claim 1, wherein each respective local memory of the local memories has a unit of access that is transferred as a unit between the respective local memory and the shared memory, wherein the respective local memory is divided into a plurality of sets corresponding to respective different units of access, and wherein a data operation in the respective local memory performed by a respective processing entity is on data in one set of the plurality of sets.

4. The non-transitory machine-readable storage medium of claim 3, wherein the local memories comprise cache memories, and the unit of access is a cache line.

5. The non-transitory machine-readable storage medium of claim 1, wherein the instructions upon execution cause the system to:
   determine, by the first processing entity, that a second data operation is to be applied to data for a further memory partition exclusively owned by the first processing entity; and
   in response to determining that the second data operation is to be applied to data for the further memory partition exclusively owned by the first processing entity, perform the second data operation by the first processing entity.

6. The non-transitory machine-readable storage medium of claim 1, wherein the first data operation that comprises writing data of the first data operation to the memory partition exclusively owned by the second processing entity comprises combining the data of the first data operation with data in the memory partition exclusively owned by the second processing entity.

7. The non-transitory machine-readable storage medium of claim 1, wherein the forwarding of the first data operation from the first processing entity to the second processing entity comprises sending a message from the first processing entity to the second processing entity, the message comprising information of the first data operation.

8. The non-transitory machine-readable storage medium of claim 7, wherein the message further comprises information of data on which the first data operation is to be applied.

9. The non-transitory machine-readable storage medium of claim 7, wherein the second processing entity is associated with a queue, and wherein the sending of the message to the second processing entity comprises writing the message to the queue.

10. The non-transitory machine-readable storage medium of claim 9, wherein the instructions upon execution cause the system to:
collect multiple messages in the queue; and
send a batch of the multiple messages for processing of respective data operations by the second processing entity.

11. A computer system comprising:
a shared memory to store a common data structure; and
one or more processors executing a plurality of processing entities comprising a first processing entity and a second processing entity, the plurality of processing entities to access the common data structure in the shared memory, wherein each processing entity of the plurality of processing entities has exclusive ownership of a corresponding memory partition of the plurality of memory partitions of the shared memory address space, such that a respective memory partition is not subject to access contention by multiple processing entities of the plurality of processing entities,
wherein the first processing entity is to:
in response to determining that a first data operation is to be applied to data in a memory partition exclusively owned by the second processing entity, and
forward the first data operation to the second processing entity, and
wherein the second processing entity is to perform the first data operation forwarded from the first processing entity, the first data operation comprising writing data of the first data operation to the memory partition exclusively owned by the second processing entity using a non-atomic operation.

12. The computer system of claim 11, wherein the plurality of processing entities comprise a plurality of threads.

13. The computer system of claim 11, wherein the first processing entity is to:
determine that a second data operation is to be applied to data for a further memory partition exclusively owned by the first processing entity, and
in response to determining that the second data operation is to be applied to data for the further memory partition exclusively owned by the first processing entity, perform the second data operation by the first processing entity.

14. The computer system of claim 11, wherein the forwarding of the first data operation from the first processing entity to the second processing entity comprises sending a message from the first processing entity to the second processing entity, the message comprising information of the first data operation.

15. The computer system of claim 14, further comprising a queue associated with the second processing entity, wherein the forwarding of the first data operation from the first processing entity to the second processing entity comprises sending the message to the queue associated with the second processing entity.

16. The computer system of claim 15, wherein the queue is to collect multiple messages, and the queue is to transfer a batch of the multiple messages for processing of respective data operations by the second processing entity.

17. The computer system of claim 16, wherein the queue is a first queue in a first tier of a multi-tiered queue arrangement that further comprises a second queue in a second tier, wherein when a quantity of the multiple messages collected in the first queue exceeds a threshold, the first processing entity is to send a notification to the second queue.

18. The computer system of claim 17, wherein the second processing entity is responsive to the notification sent to the second queue to retrieve the multiple messages from the first queue.

19. A computer-implemented method comprising:
partitioning, by a computer, a shared memory that stores a common data structure into a plurality of memory partitions;
assigning exclusive ownership of memory partitions of the plurality of memory partitions to a plurality of processing entities, the plurality of processing entities to access the common data structure in the shared memory, wherein each processing entity of the plurality of processing entities has exclusive ownership of a corresponding memory partition of the plurality of memory partitions of the shared memory address space, such that a respective memory partition is not subject to access contention by multiple processing entities of the plurality of processing entities;
receiving, by a first processing entity of the plurality of processing entities, first data on which a first data operation is to be applied;
in response to determining that the first data is to be written to a memory partition exclusively owned by the second processing entity, sending, by the first processing entity to the second processing entity, a message comprising information of the first data operation;
after sending the message, disassociating, by the first processing entity, from the first data operation; and
in response to receiving the message, performing, by the second processing entity, the first data operation that comprises writing data of the first data operation to the memory partition exclusively owned by the second processing entity using a non-atomic operation.

* * * * *